United States Patent [19]

Glaus

[11] Patent Number: 4,644,899
[45] Date of Patent: Feb. 24, 1987

[54] PROCESS AND APPARATUS FOR UV-POLYMERIZATION OF COATING MATERIALS

[76] Inventor: Bernhard Glaus, Holzstrasse 41, 9010 St. Gallen, Switzerland

[21] Appl. No.: 767,325

[22] Filed: Aug. 21, 1985

[30] Foreign Application Priority Data

Aug. 31, 1984 [CH] Switzerland ............... 4176/84

[51] Int. Cl.$^4$ .............................................. B05D 3/06
[52] U.S. Cl. ............................... 118/642; 250/504 R; 427/54.1
[58] Field of Search ............... 250/504 R; 427/54.1; 118/642

[56] References Cited

U.S. PATENT DOCUMENTS

| | | | |
|---|---|---|---|
| 3,686,940 | 8/1972 | Kockott | 250/504 R |
| 4,019,062 | 4/1977 | Rongren | 250/504 R |
| 4,048,490 | 9/1977 | Troue | 250/504 R |
| 4,149,086 | 4/1979 | Nath | 250/504 R |

*Primary Examiner*—John H. Newsome
*Attorney, Agent, or Firm*—William R. Hinds

[57] ABSTRACT

The rays of the UV-radiation source (2) are directed on to the coated substrate (1) by a partially transmissive mirror (3). The heat-bearing IR-rays pass through the mirror in a straight line and are possibly absorbed by a cooling means. In that way, the surface temperature at the substrate can be greatly reduced.

3 Claims, 2 Drawing Figures

PROCESS AND APPARATUS FOR UV-POLYMERIZATION OF COATING MATERIALS

The invention relates to a process for UV-polymerisation of coating materials, as set forth in the classifying portion of claim 1, and an apparatus for carrying out the process, as set forth in the classifying portion of claim 2. UV-polymerisation is used to harden and dry coating materials such as varnishes, paints and filler or primer materials, which react under ultraviolet radiation. That procedure has been known for decades and is used in particular in the printing art. The ink, paint or varnish remains capable of flow until it is put to use and, after the printing operation, can be caused to set abruptly under the influence of the UV-rays.

A general review of the state of the art in relation to UV-polymerisation in the printing art is to be found in the article by Wolfgang Grebe 'Die UV-Technologie in Druck- und Packstoffveredlung' in the journal 'Paper+Kunstoff-Verarbeiter', issues 12/81, 1/82 and 2/82. A medium pressure mercury arc tube is generally used as the UV-radiation source. The radiation from a mercury arc tube comprises about 25% visible light, 15 to 25% UV radiation and about 60% heat-intensive infrared radiation. The temperature at the radiation source can rise to about 900° C. The high temperature and the large proportion of IR-radiation, which in itself is undesirable, often cause problems when using UV-polymerisation.

When subjected to radiation over an excessively long period, the substrate can be damaged by the IR-radiation and in the extreme case can even be overheated to such a degree that it experiences self-ignition. However, it is not possible for the residence time beneath the UV-radiation to fall below a given minimum value, in order to achieve complete drying and hardening. Particularly when dealing with heat-sensitive substrates as print carriers such as foils, packaging means of plastic material such as for example yoghurt pots and the like, excessive temperatures immediately give rise to deformation and thus permanent damage. However, papers or cardboard can also suffer damage as a result of overheating due to shrinkage or bubbling.

To solve that problem, it has already been proposed that the IR-component of the radiation may be filtered out by means of a quartz plate or disc. A radiation filter of that kind however gives only a relatively slight reduction in temperature at the substrate itself. On the other hand, the filter also gives rise to a loss in respect of UV-radiation, which is undesirable. The removal of heat also gives rise to difficulties in regard to the radiation filter.

An object of the present invention is therefore to provide a process and an apparatus of the kind set forth in the opening part of this specification, wherein the substrate is as far as possible acted upon only by the UV-component of the radiation and possibly a desired residual component of IR-rays, and in which the greatest part of the heat-intensive IR-radiation can be kept away from the substrate in a very simple manner and the heat thereof can be removed without difficulty. Another object of the invention is to provide an apparatus which can be adapted in the optimum fashion to the operating conditions of a processing station which is disposed upstream or downstream of the polymerisation apparatus.

In regard to the process, that object is achieved by a process having the features set forth in the characterising portion of claim 1, while in regard to the apparatus, that object is attained by an apparatus having the features set forth in the characterising portion of claim 2.

Deflection of the UV-radiation by a partially transmissive mirror makes it possible to eliminate up to 90% of the heat radiation which impinges on the substrate. The IR-radiation is not diverted away or absorbed as when using a radiation filter, but passes through the mirror in a straight line. Only deflected rays impinge on the substrate so that not just the radiation which is focussed and reflected by the reflector means but also the direct radiation from the radiation source is reduced, in the IR-component. Specifically, it is already known to use reflector means which already reduce the IR-component of the reflected radiation. Reflector means of that kind can further improve the efficiency of an apparatus according to the invention.

If the mirror is arranged pivotably in the beam of the UV-radiation source, the direction of the rays and possibly the surface which is acted upon by the beam may be adjusted with the mirror, without the need to carry out manipulation operations at the extremely sensitive and hot radiation source. If the mirror is arranged at an angle of 45° with respect to the optical axis of the beam and if it can be pivoted to deflect the beam away from the substrate, through 90°, the radiation can be easily and quickly deflected away for example in the event of an interruption in operation of the arrangement. When that is done, the beam path of the heat-intensive IR-radiation is not affected and still goes in a straight line. There is no longer any need to screen off the radiation by what are referred to as shutters. In addition, the rotary movement of the mirror may be controlled in a very simple manner by a servo steering arrangement which turns the mirror away as soon as there is an operating defect or fault or an interruption in operation of the arrangement.

The heat is advantageously carried away by virtue of the fact that a cooling means is arranged behind the mirror in the path of the rays with a higher thermal content, that pass through the mirror. In relation to arrangements of larger sizes, a compact construction is often unavoidable so that the IR-radiation cannot be radiated out uncontrolledly. A cooling means may comprise for example a housing wall which is provided with cooling ribs and over which an air flow passes or which delivers the heat to a cooling fluid.

It is possible to achieve a particularly low rise in temperature of the substrate if disposed in the beam reflected by the first mirror is a second mirror for making a selection in respect of the rays, the second mirror directing the UV-rays on to the substrate while the remaining portion of rays with a higher heat content passes through the second mirror in a straight line.

Embodiments of the invention are described in greater detail hereinafter and illustrated in the drawings in which.

Figure 1:
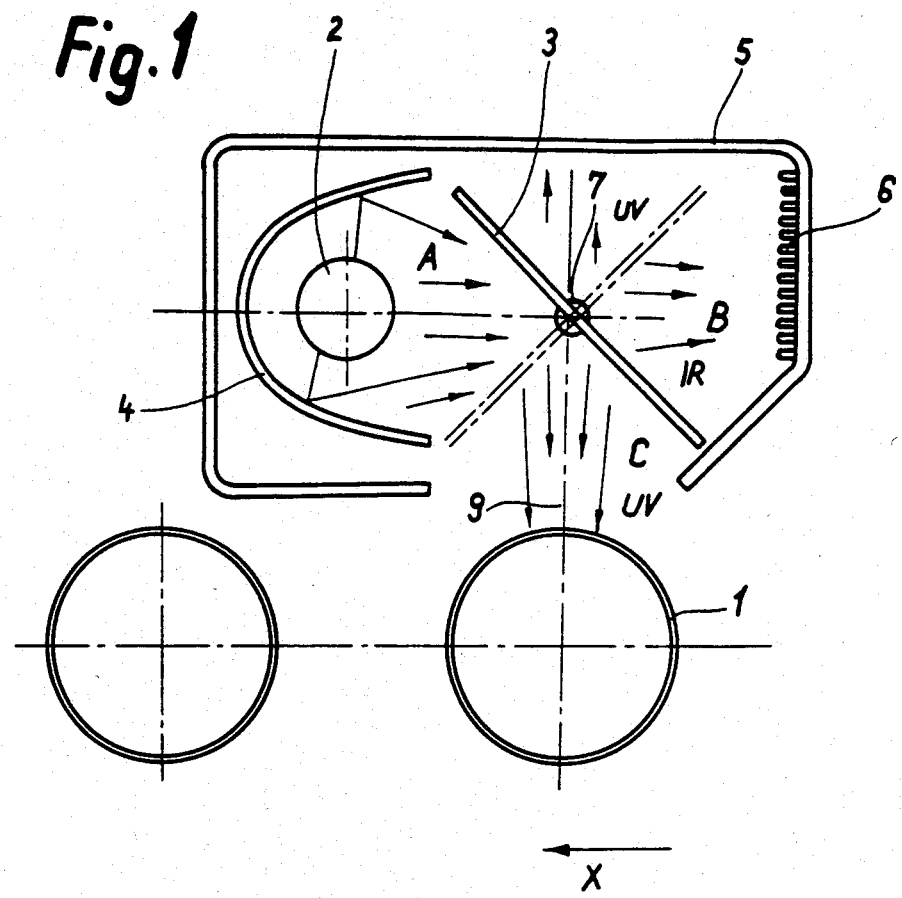
FIG. 1 is a plan view of an apparatus with a mirror.

As shown in FIG. 1, the rays of a UV-radiation source 2 are focussed by means of a reflector 4, the radiated beam A having the entire emission spectrum of the radiating system. The rays A impinge on a semi-transparent mirror 3 which makes a selection in respect of the rays. The component of IR-rays B, with a higher heat content, passes through the mirror in a straight line. On the other hand, the UV-rays C are deflected by the mirror on to the substrate 1. Partially transmissive mirrors of that kind are already per se known and conventional for other purposes. On their surface, they have a plurality of thin layers or films of metal oxides having dielectric properties. The coating or transmissiveness of the mirror can be so selected that, depending on the respective purpose of use, a residual component of IR-radiation impinges on the substrate, at the desired level of intensity.

The coated substrates 1, such as for example yoghurt pots, are moved cyclically or continuously past the beam C in the direction indicated by the arrow X. The optical axis 9 of the UV-beam is deflected preferably through 90° by the mirror 3. It will be appreciated however that it is also possible to envisage using a different angle of deflection. Thus it would be possible for example for two apparatuses to be arranged in juxtaposed relationship in such a way that the UV-beams of each apparatus are superimposed on each other at the substrate. With that kind of arrangement, it will be seen that a different deflection angle would be required.

The radiation source 2, the reflector 4 and the mirror 3 are preferably disposed in a housing 5. Cooling ribs 6 are directly integrated into the wall of the housing in the ray path of the heat-intensive IR-rays B. The housing 5 is cooled on its inside and/or outside by an air flow. It will be appreciated that any desired cooling means such as for example cooling coils with a cooling fluid passing therethrough, or the lke, could be used to absorb the IR-rays.

The mirror is mounted in the housing 5 pivotably about a pivot axis 7. If for example in the event of an interruption in operation or for maintenance operations, the substrate 1 which is possibly stationary is no longer to be irradiated, the mirror 3 can be pivoted through 90° so that it takes up the position shown in dash-dotted lines. It will be seen that, in that position, the UV-rich beam C is deflected through 180° so that it impinges on the wall of the housing 5. When that occurs, the radiation source is preferably additionally also switched to half load. There is no advantage in completely switching off the radiation source as, as is known, a mercury arc tube must first be cooled down before it can be fired again. The mirror pivoting means may be combined for example with a servo control means so that the beam C is automatically deflected in the event of interruptions in operation.

Figure 2:
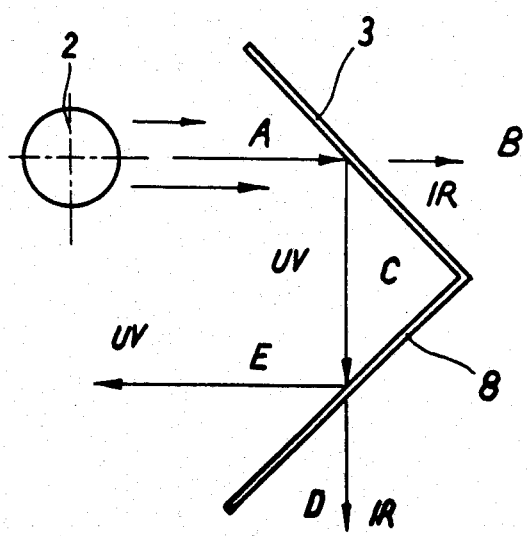
FIG. 2 is a diagrammatic view of an embodiment having two mirrors.

Excellent results can already be achieved with a single mirror configuration. Substrate temperatures of 70° to 80° C. without the use of a mirror, with a residence time of less than one second, can be reduced to about 30° C., when the mirror is used. It is possible to achieve an additional improvement in the efficiency of the arrangement if a double mirror configuration is used, as shown in diagrammatic form in FIG. 2.

The UV-beam C which is split off with the first mirror 3 impinges on a second mirror 8 which permits the remaining component of the IR-radiation to pass and which in turn radiates away the UV-radiation, as a beam E. With this arrangement also, comprising two mirrors, it will be appreciated that the optical axes do not necessarily have to be diverted through 90° in each case.

I claim:

1. Apparatus for hardening polymerisable coating materials on a cyclically or continuously moving substrate, in particular printing inks and varnishes, comprising at least one ultraviolet radiation source in a housing, a reflector system for focusing the rays emitted by the radiation source onto the substrate, said system including a mirror pivotally arranged in the housing and in the beam of the ultraviolet radiation source, said mirror having a thin film coating with dielectric properties for making a selection in respect of the rays in such a way that the mirror in one pivoted position directs the greatest part of the ultraviolet rays through an opening in the housing onto the substrate while the component of rays having a higher thermal content passes through the mirror in a straight line toward a wall of the housing, and cooling means disposed in the housing behind the mirror in the path of rays with higher thermal content that pass through the mirror.

2. Apparatus according to claim 1 characterised in that the mirror (3) is arranged at an angle of 45° to the optical axis (9) of the beam and that it can be pivoted for deflecting the beam away from the substrate (1), through 90°, such that the deflected beam is directed away from said opening, and the pass-through rays continue in their path toward said cooling means.

3. Apparatus according to claim 1 characterised in that disposed in the beam (C) which is reflected by the first mentioned mirror (3) is a second mirror (8) which makes a selection in respect of the rays and which directs the UV-rays on to the substrate while the residue of rays (D) with a higher heat content pass through the second mirror in a straight line.

* * * * *